United States Patent
Patt

(10) Patent No.: US 12,534,897 B1
(45) Date of Patent: Jan. 27, 2026

(54) WASTE DISPOSAL HOSE SEAL APPARATUS FOR RECREATIONAL VEHICLES

(71) Applicant: Randall Aaron Patt, Bakersfield, CA (US)

(72) Inventor: Randall Aaron Patt, Bakersfield, CA (US)

(*) Notice: Subject to any disclaimer, the term of this patent is extended or adjusted under 35 U.S.C. 154(b) by 0 days.

(21) Appl. No.: 19/318,030

(22) Filed: Sep. 3, 2025

(51) Int. Cl.
*E03F 1/00* (2006.01)
*E03F 7/06* (2006.01)

(52) U.S. Cl.
CPC ............ *E03F 1/008* (2013.01); *E03F 7/06* (2013.01)

(58) Field of Classification Search
CPC ........ E03F 1/008; E03F 7/06; Y10T 137/6855
See application file for complete search history.

(56) References Cited

U.S. PATENT DOCUMENTS

| 5,947,156 A | * | 9/1999 | Tomczyk | E03F 1/008 137/355.16 |
| 7,156,574 B1 | * | 1/2007 | Garst | B60R 15/00 137/181 |
| 2007/0052235 A1 | * | 3/2007 | Buff | F16L 23/003 285/368 |

* cited by examiner

*Primary Examiner* — P. Macade Nichols
(74) *Attorney, Agent, or Firm* — James M. Duncan; Young Wooldridge, LLP

(57) ABSTRACT

A waste hose seal apparatus provides a rodent and pest barrier into the service compartment of a recreational vehicle. The apparatus includes a seal assembly having a first section which snaps into place within the circular opening of the access port into service compartment, the seal assembly remaining in place by an interference fit between a circumferential edge surface of the seal assembly and an inside edge of the access port bushing. The seal assembly may also have an interior section having a domed configuration with an oculus defined by an inside edge surface configured to seal against an outside facing surface of the waste disposal hose.

6 Claims, 7 Drawing Sheets

WASTE DISPOSAL HOSE SEAL APPARATUS FOR RECREATIONAL VEHICLES

BACKGROUND OF THE INVENTION

The present invention generally relates to recreational vehicles (or "RVs"). The present invention more particularly relates to transfer of waste water from the recreational vehicle to an exterior waste disposal facility through a waste disposal hose. The present invention more particularly provides a seal around the waste disposal hose and the existing access port through which the waste hose is deployed when the onboard tanks are being emptied. The seal provided by the present invention prevents pests from entering the recreational vehicle.

Recreational vehicles typically have a "grey water tank", which holds waste water draining from sinks and shower, and a "black water tank" which holds waste which is flushed down toilets. The grey water tank and the black water tank, generally made from a tough plastic such as polyethylene, are typically located beneath the flooring of the RV. The grey water tank and black water tank are holding tanks which must periodically be drained. Typically, the grey water tank and black water tank have outlets which join at a tee connection, the tee having an outlet end configured to connect an end of a waste disposal hose. The grey water tank and the black water tank each have manually operated drain valves which allow an operator to selectively drain each tank through the tee to the connected waste disposal hose. The drain valves and the tee are located within the service compartment of the RV. The waste disposal hose is typically inserted into the service compartment through a waste access port located at the bottom of the service compartment. When not in use, the waste access port has a cover or cap which screws into or snaps over the waste access port to close access into the service compartment.

Waste from the grey water tank and black water tank may be drained from those tanks into an appropriate waste facility, such as the sewer system of an RV park, which may drain either to a septic system or to a municipal sewer system. An RV owner may park their vehicle at an RV park and connect an end of a waste disposal hose to an outlet in the RV service compartment which selectively receives flow from the grey water tank and black tank. The opposite end of the waste disposal hose is connected to the inlet of the park septic system or municipal sewer.

In many RV parks, an RV may stay at the site for an extended period of time, with the waste disposal hose remaining connected between the RV holding tanks and the RV sewer system. Whenever the waste access port is opened and the waste hose is inserted through the port, there will be openings between the flange of the waste access port and the outside surface of the waste hose. Unless these openings are sealed off, rodents (e.g., rats, mice, squirrels, and the like) and other pests (e.g., insects) can gain entry into the service compartment, and thus gain entry into other space within the RV.

SUMMARY OF THE INVENTION

Embodiments of the presently disclosed invention provide a solution to the above-described problem. Embodiments of the presently disclosed waste hose seal apparatus are used in combination with a recreational vehicle. The recreational vehicle has a waste system comprising a grey water tank and black water tank which both drain into a common tee fitting. The tee fitting has an outlet disposed within a service compartment of the recreational vehicle. An access port is disposed within a bottom panel of the service compartment, where the access port has an access port flange, comprising a plate having a circular opening therethrough. A waste disposal hose is configured to be removably attached to the outlet. The waste disposal hose has a first end attached to the outlet and has a length which passes through the circular opening.

A seal assembly seals off any openings between the circular opening and the exterior surface of the waste hose. The seal assembly has a first section having a first diameter portion disposed at a first end of the seal assembly, a second diameter portion at a second end of the seal assembly, and a third diameter portion disposed between the first diameter portion and the second diameter portion. A circumferential channel is defined at the third diameter portion between the first diameter portion and the second diameter portion, and the first section is configured to be manually disposed within the circular opening and retained therein by an interference fit, with an edge of the plate received within the circumferential channel. The seal assembly has a second section which extends from the second diameter section. The second section has a domed configuration having an oculus wherein the oculus comprises an inside edge surface configured to seal against an against an outside facing surface of the waste disposal hose. The seal assembly

DETAILED DESCRIPTION OF THE INVENTION

Figure 1:
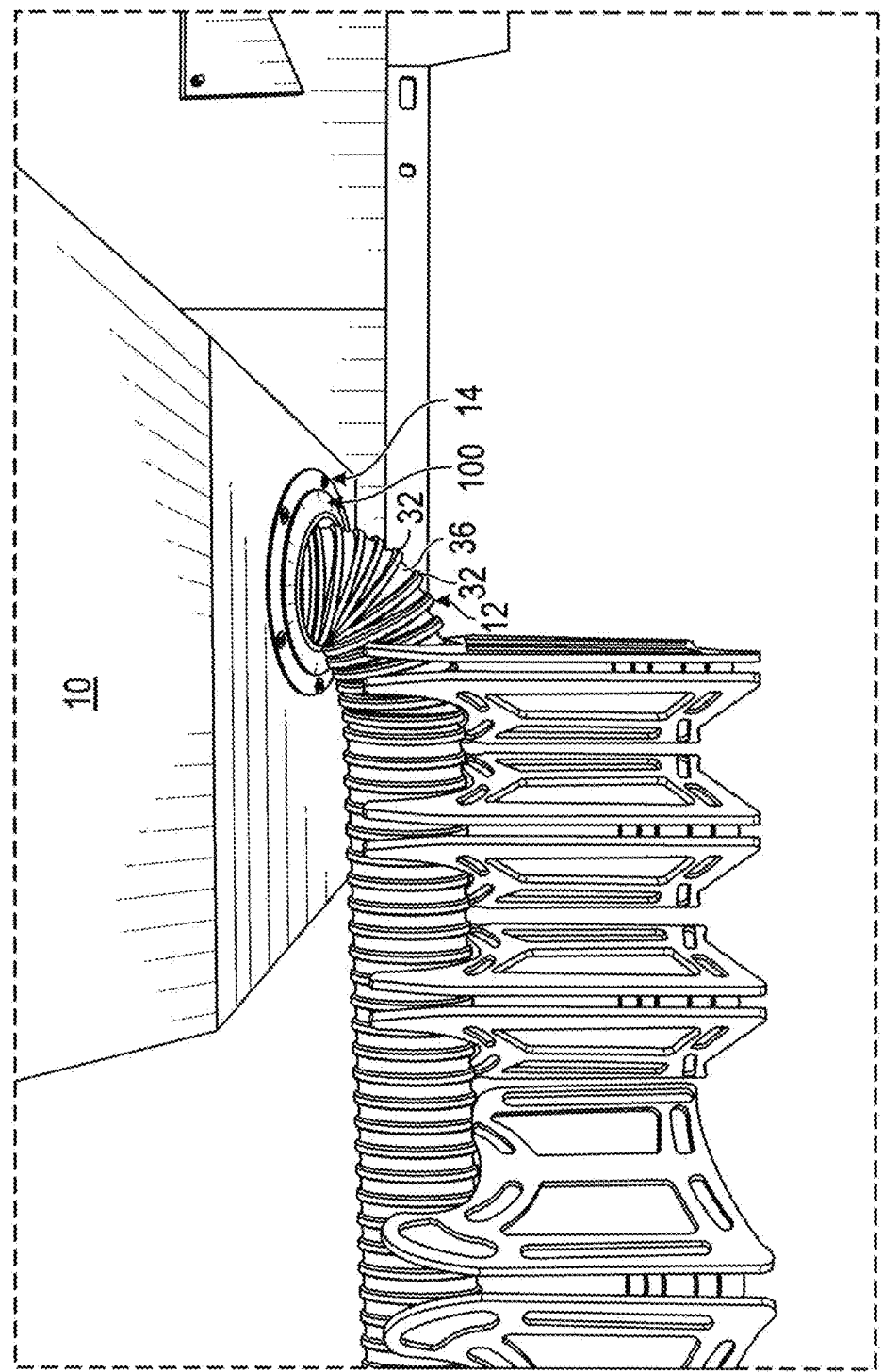
FIG. 1 depicts a side view of the exterior of a service compartment of a recreational vehicle with a waste disposal hose inserted through an embodiment of the present invention which is seated within the access port of the service compartment.

FIG. 1 depicts a service compartment 10 of a recreational vehicle with a waste hose 12 extending through an access port 14 to enter the interior of the service compartment. FIG. 1 shows the waste hose 12 as it would be positioned to provide drainage of the waste tanks of the recreational vehicle, with waste hose 12 supported by hose support 14. FIG. 1 shows an embodiment of the presently disclosed seal assembly 100 disposed within the access port 14. Embodiments of the seal assembly 100 provide a waste hose seal apparatus used in combination with a recreational vehicle waste system.

Figure 2:
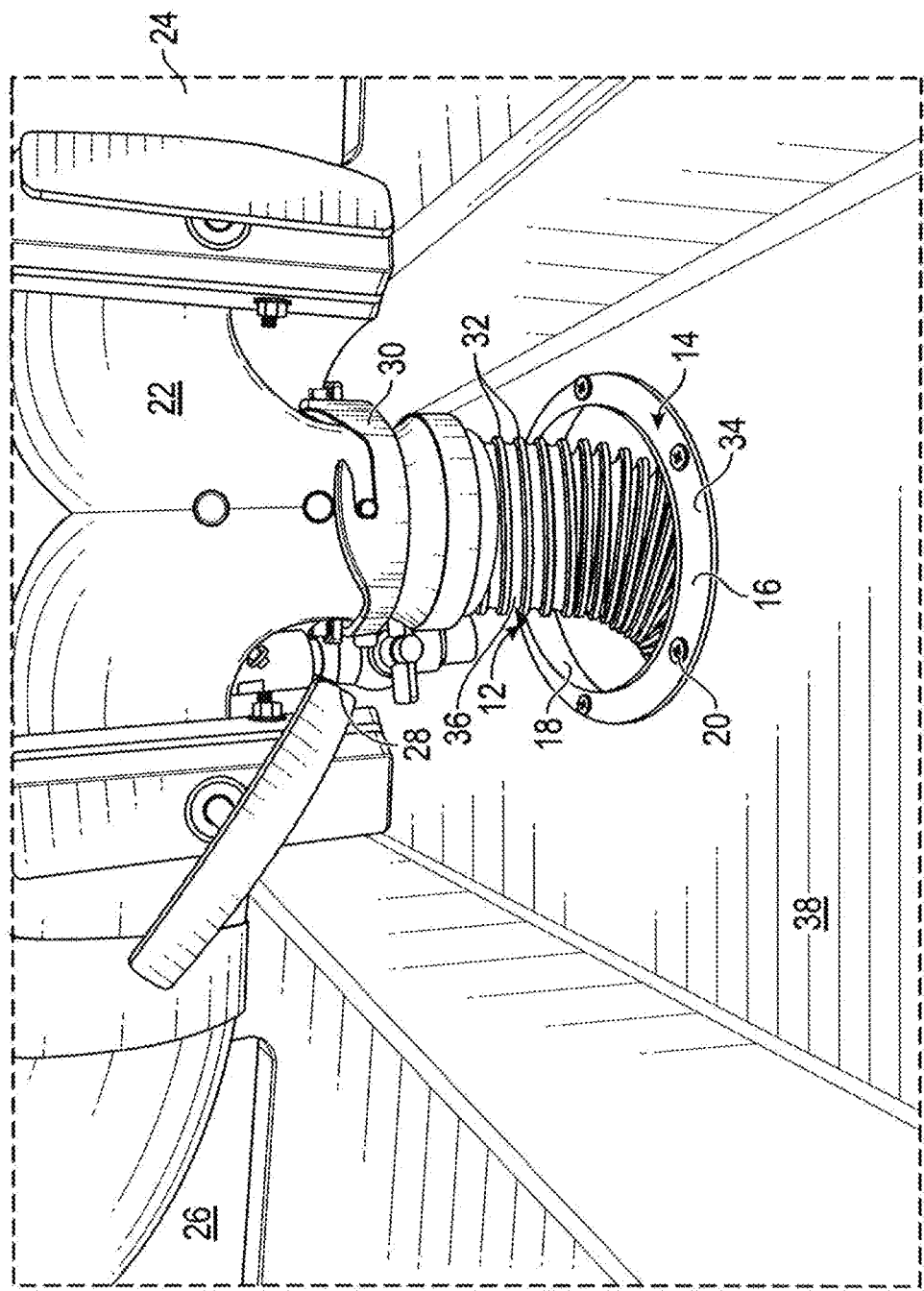
FIG. 2 depicts the prior art interior view of the service compartment showing the waste disposal hose attached to outlets connected to a grey water tank and a black water tank.

FIG. 2 depicts a prior art view of a configuration of a service compartment 10 of the recreational vehicle having a length of waste hose 12 extending through access port 14 but without any seal around the waste hose and the access port, thereby allowing entry by various rodents and other pests which enter through the space between the hose and the access port. Common practice is to stuff a rag, towel, old shirt, etc., in the opening between the waste hose 12 and the access port 14 to prevent such entry. Access port 14 comprises a bushing 16 having an access port flange 34 having a circular opening defined by an edge 18 of the bushing. The circular opening typically has a diameter of approximately 5 inches. The circular opening of bushing 16 may have threads which allows a removable plug to be screwed into the access port 14 to seal the service compartment when access is not required. As indicated in FIG. 2, bushing 16 is typically held in place within the access port 14 by screws 20 which are inserted through flange 34 which screw into an exterior facing wall of the service compartment 10.

As shown in FIG. 2, waste hose 12 connects to outlet 22 which typically is connected to a grey water tank 24 on one side and a black water tank 26 on the other side. A selector valve 28 allows the manual selection of outflow from either the grey water tank 24 or the black water tank 26. Waste hose 12 attaches to outlet 22 with a quick connect coupling 30, such as that depicted in FIG. 2, and is routed outside of the service compartment 10 through access port 14, so that the other end may be connected to a waste disposal line or vessel. It is to be appreciated that the circular opening of the access port 14 as defined by edge 18 must be sufficiently large for quick connect coupling 30 to fit through it.

Waste hose 12 is fabricated from durable and flexible materials such as heavy-duty vinyl, plastic, polypropylene or thermoplastic elastomer, and is often reinforced with steel wire or thermoplastic elastomer. The flexibility of waste hose 12 is further enhanced by its coiled wire or bead construction, with each coil 32 attached to an adjacent coil by a section of matrix material forming the outside facing surface 36 of the waste hose. A waste hose 12 for a recreational vehicle will typically have a 3-inch diameter.

Figure 3:
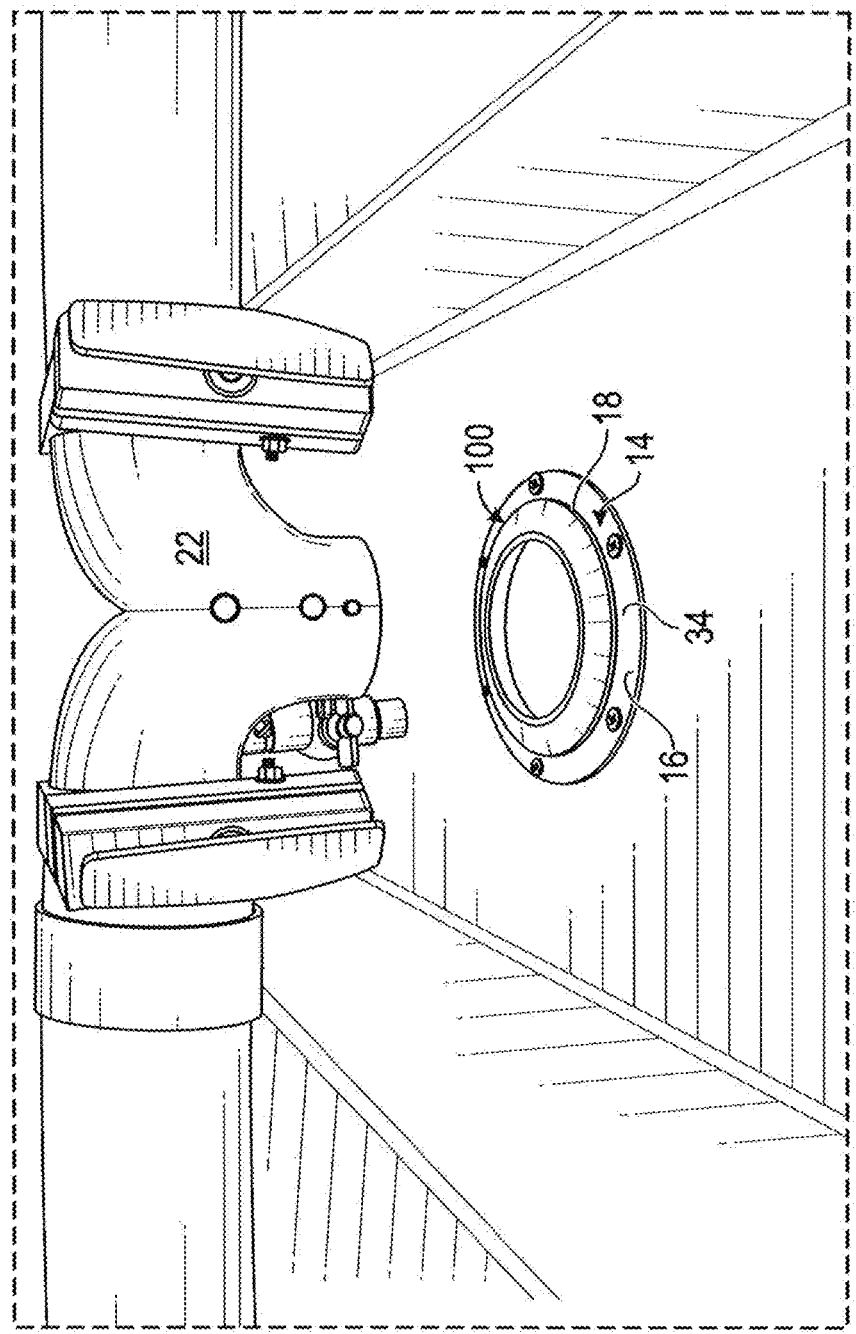
FIG. 3 depicts an interior view of the service compartment showing an embodiment of the presently disclosed seal assembly disposed within the access port with the waste disposal hose disconnected.
Figure 4:
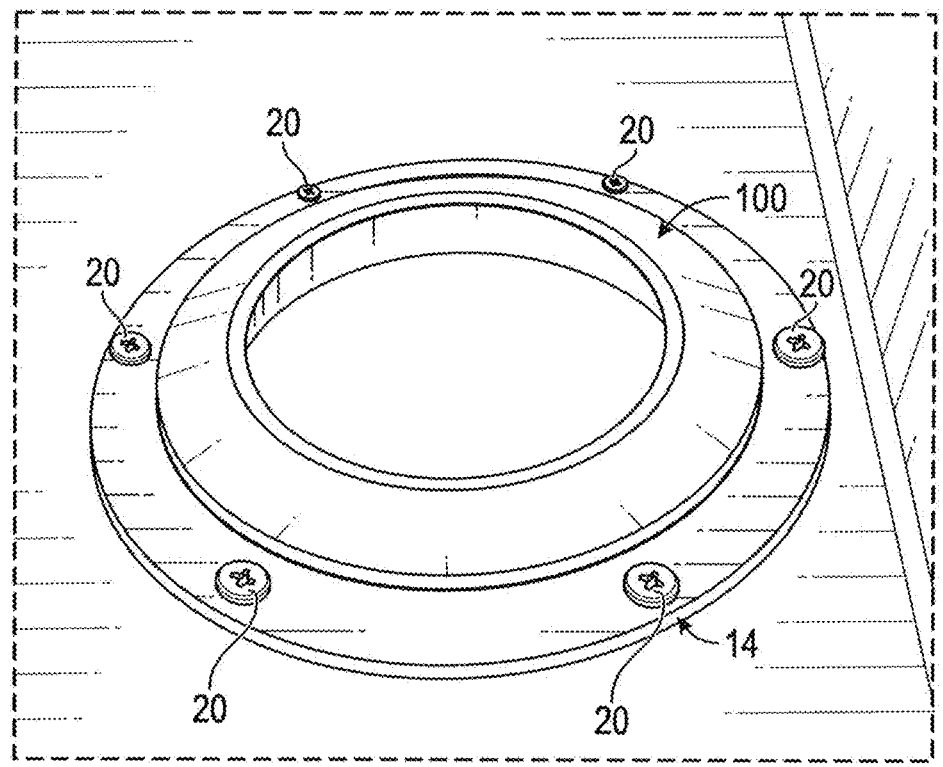
FIG. 4 shows a close-up view of an embodiment of the presently disclosed seal assembly disposed within the access port.
Figure 5:
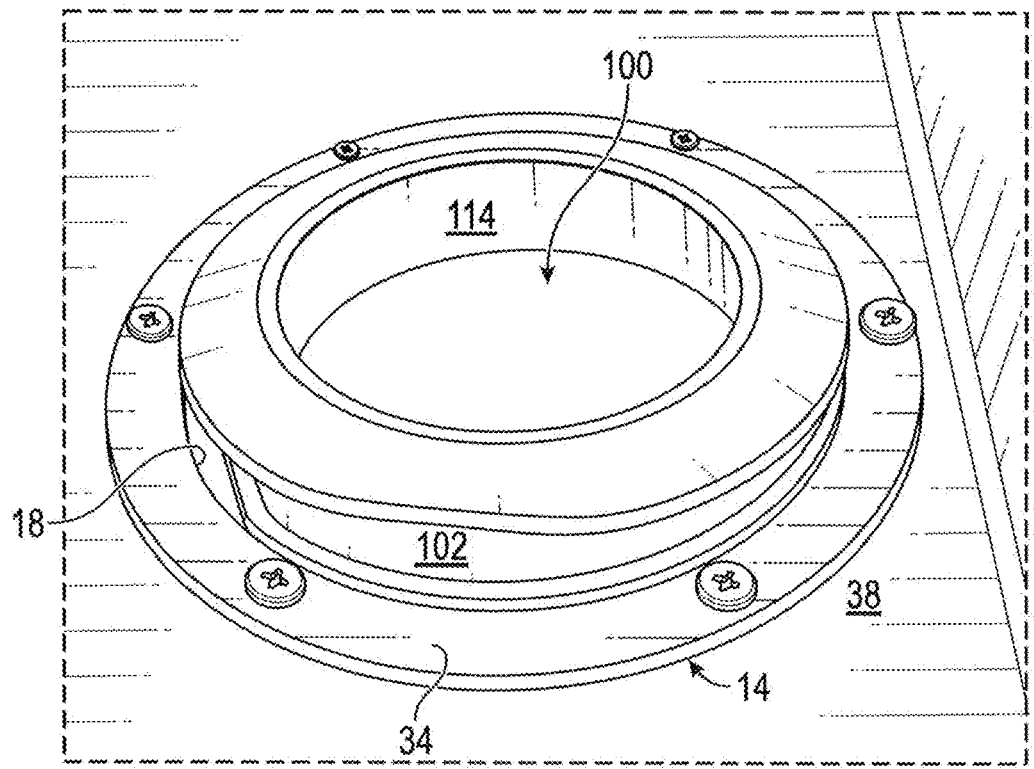
FIG. 5 shows a close-up view of an embodiment of the presently disclosed seal assembly partially removed from the access port to show a partial view of the profile of the seal assembly.

FIGS. 3 through 5 show the interior of service compartment 10 with an embodiment of the presently disclosed seal assembly 100 set within access port bushing 16. Access port bushing 16 may have a circular opening extending therethrough. It is to be appreciated that seal assembly 100 is fabricated from a generally pliable but also rigid material, having some give. Appropriate materials include polypropylene, nylon, thermoplastic polyurethanes, thermoplastic elastomer, silicone, fiber reinforced composites, and the like. The chemical and physical properties of seal assembly 100 allows the seal assembly to be inserted into the circular opening of access port 14 and be snapped into place retained within the access port therein by an interference fit between edge 18 of the access port and circumferential edge surface 102 of the seal assembly as shown in FIG. 5.

Figure 6:
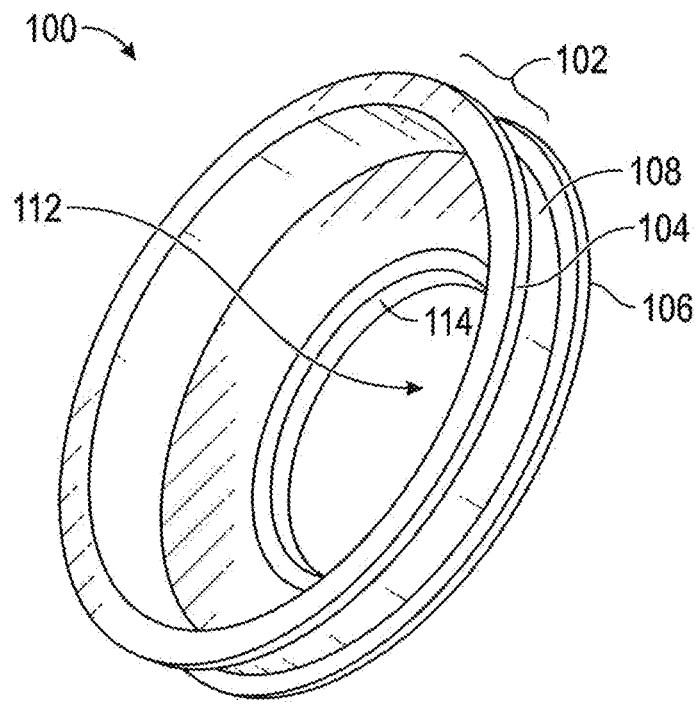
FIG. 6 shows a perspective view of an embodiment of the seal assembly.
Figure 7:
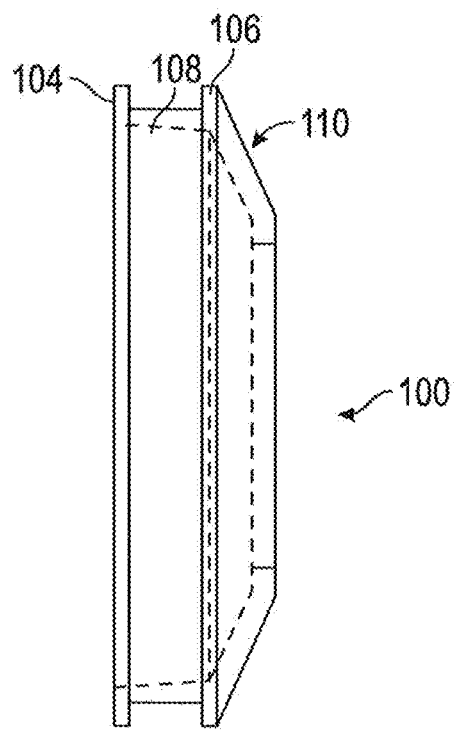
FIG. 7 shows a side view of the of the seal assembly of FIG. 6.
Figure 8:
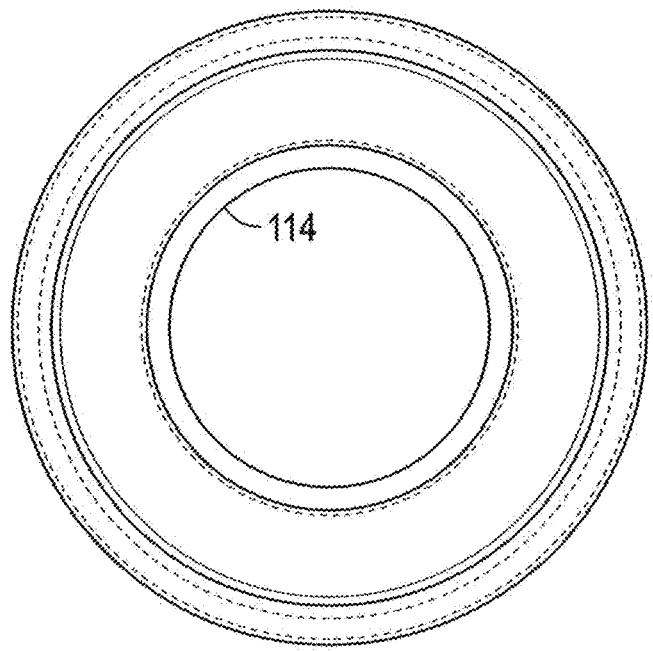
FIG. 8 shows a bottom view of the seal assembly of FIG. 6.
Figure 9:
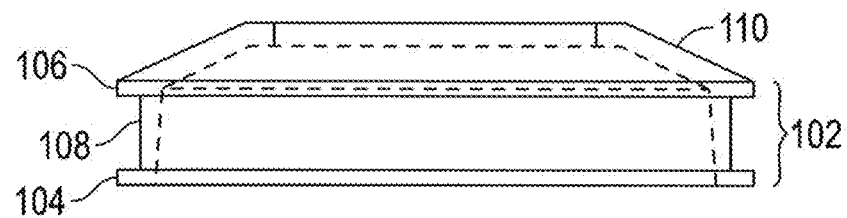
FIG. 9 shows an elevation view of the seal assembly of FIG. 6.

FIGS. 6 through 9 show a detailed view of an embodiment of the seal assembly 100. As shown in FIG. 6, seal assembly 100 comprises a circumferential edge surface 102. The circumferential edge surface 102 comprises a first diameter portion 104 disposed at an end of the seal assembly 100 having the larger diameter opening. The larger diameter opening will be positioned such that it will be facing toward the exterior of the service compartment 10. The circumferential edge surface also comprises a second diameter portion 106 disposed at the end of the seal assembly having the smaller diameter opening, which will be positioned such that it will be facing toward the interior of the service compartment 10. In the typical installation, with the access port 14 positioned on the bottom panel 38 of the service compartment 10, the first diameter portion 104 will be positioned at the lower end of the seal assembly 100 and the second diameter portion 106 will be positioned at the upper end of the seal assembly. A third diameter portion 108 is disposed between the first diameter portion 104 and the second diameter portion 106, wherein a circumferential channel is defined at the third diameter portion between the first diameter portion and the second diameter portion.

With the above configuration, the circumferential edge surface 102 is configured to be manually snapped into place within the circular opening defined by edge 18 of the access port bushing 16, with edge 18 being received within the circumferential channel defined by the first diameter portion 104 and the second diameter portion 106, with edge 18 abutting the third diameter portion 108. As discussed above, the seal assembly 100 is fabricated from a generally pliable but also rigid material which allows the seal assembly to be manually snapped into place within the access port bushing 16, with the second diameter portion 106 abutting access port flange 34.

Figure 10:
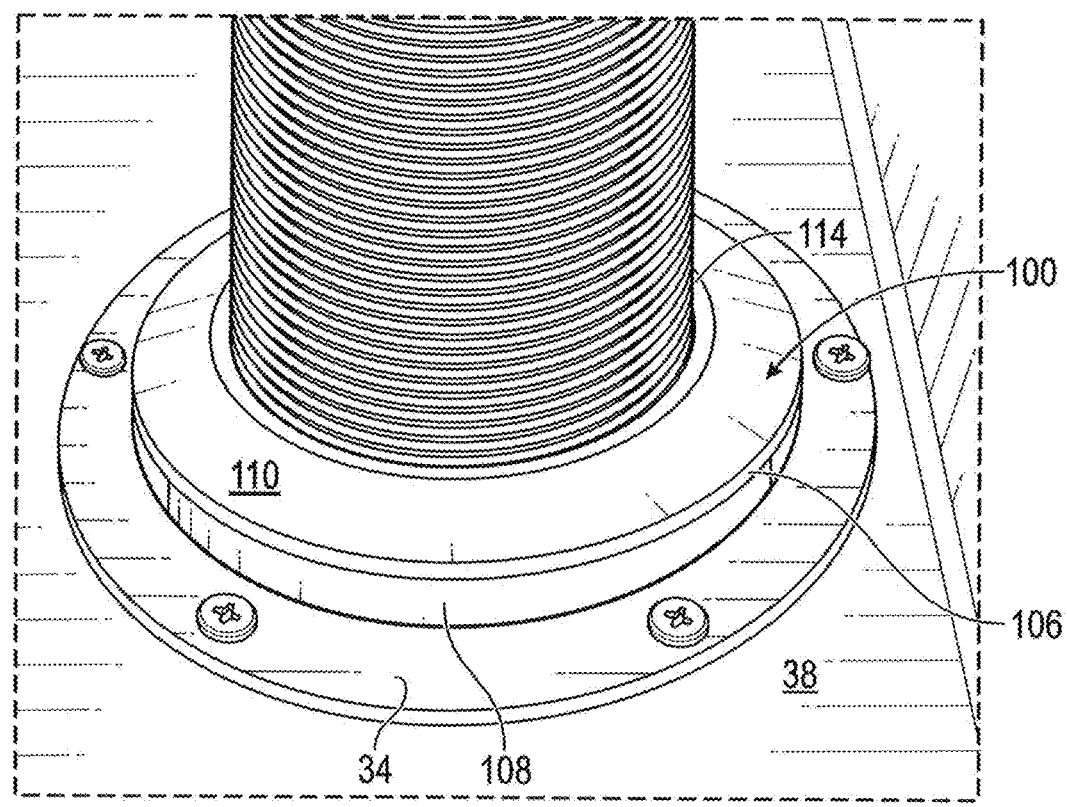
FIG. 10 shows a view of the presently disclosed seal assembly partially disposed in a sealing connection with the access port and sealing around a waste hose extending through the seal assembly.

Seal assembly 100 also has an interior section 110 which extends from the second diameter portion 106. The interior section 110 is configured as a dome having an oculus 112. The oculus 112 is defined by an inside edge surface 114 in the dome. The size of oculus 112 and the material of inside edge surface 114 are configured to allow the snug passage of both the waste hose 12 and the attached quick connect coupling 30 through the oculus. Once the quick connect coupling 30 has been attached to outlet 22, the inside edge surface 114 will seal against the outward facing surface 36 of the waste hose 12 with inside edge surface positioned between adjacent coils 32 of the waste hose as depicted in FIG. 10. FIG. 10 shows seal assembly 100 ready to be snapped into position within access port flange 34, with a portion of the circumferential channel having the third diameter portion 108 ready to be pushed into position.

Having thus described the preferred embodiment of the invention, what is claimed as new and desired to be protected by Letters Patent includes the following:

The invention claimed is:

1. A waste hose seal apparatus in combination with a recreational vehicle, the combination comprising:
   a recreational vehicle waste system having an outlet disposed within a service compartment of the recreational vehicle;
   an access port disposed within a bottom panel of the service compartment, the access port comprising an access port bushing disposed therein, the access port bushing having a circular opening therethrough;
   a waste disposal hose having a first end attached to the outlet, the waste disposal hose further comprising a length which passes through the circular opening; and
   a seal assembly comprising a circumferential edge surface,
   wherein the circumferential edge surface is configured to be manually disposed within the circular opening and retained therein by an interference fit with an edge of the access port bushing, wherein the seal assembly further comprises an interior section comprising a domed configuration comprising an oculus, wherein the oculus is defined by an inside edge surface configured to seal against an against an outside facing surface of the waste disposal hose.

2. The waste hose seal apparatus of claim 1 wherein the circumferential edge surface comprises a first diameter portion disposed at a first end of the seal assembly, a second diameter portion at a second end of the seal assembly, and a third diameter portion disposed between the first diameter portion and the second diameter portion, wherein a circumferential channel is defined at the third diameter portion between the first diameter portion and the second diameter portion, and the circumferential edge surface is configured to be manually disposed within the circular opening and retained therein by an interference fit, with an edge of the access port bushing received within the circumferential channel.

3. A waste hose seal apparatus in combination with a recreational vehicle, the combination comprising:
   a recreational vehicle waste system having an outlet disposed within a service compartment of the recreational vehicle;
   an access port disposed within a bottom panel of the service compartment, the access port comprising an access port bushing disposed therein, the access port bushing having a circular opening extending therethrough;
   a waste disposal hose having a first end attached to the outlet, the waste disposal hose further comprising a length which passes through the circular opening; and
   a seal assembly comprising a circumferential edge surface comprising a first diameter portion disposed at a first end of the seal assembly, a second diameter portion at a second end of the seal assembly, and a third diameter portion disposed between the first diameter portion and the second diameter portion, wherein a circumferential channel is defined at the third diameter portion between the first diameter portion and the second diameter portion, and the circumferential edge surface is configured to be manually disposed within the circular opening and retained therein by an interference fit, with an edge of the access port bushing received within the circumferential channel.

4. The waste hose seal apparatus of claim 3 further comprising an interior section extending from the second diameter portion, the interior section comprising a domed configuration comprising an oculus, wherein the oculus is defined by an inside edge surface configured to seal against an against an outside facing surface of the waste disposal hose.

5. A waste hose seal apparatus in combination with a recreational vehicle, the combination comprising:
   a recreational vehicle waste system having an outlet disposed within a service compartment of the recreational vehicle;
   an access port disposed within a bottom panel of the service compartment, the access port comprising an access port bushing disposed therein, the access port bushing having a circular opening therethrough;
   a waste disposal hose having a first end attached to the outlet, the waste disposal hose further comprising a length which passes through the circular opening; and
   a seal assembly comprising a circumferential edge surface comprising a first diameter portion disposed at a first end of the seal assembly, a second diameter portion at a second end of the seal assembly, and a third diameter portion disposed between the first diameter portion and the second diameter portion, wherein a circumferential channel is defined at the third diameter portion between the first diameter portion and the second diameter portion, wherein the circumferential edge surface is configured to be manually disposed within the circular opening and retained therein by an interference fit, with an edge of the access port bushing received within the circumferential channel, wherein the seal assembly further comprises an interior section extending from the second diameter portion, the interior section comprising a domed configuration comprising an oculus, wherein the oculus is defined by an inside edge surface configured to seal against an against an outside facing surface of the waste disposal hose.

6. The waste hose seal apparatus of claim 5 wherein the seal assembly is fabricated from a material selected from a group consisting of polypropylene, nylon, thermoplastic polyurethanes, thermoplastic elastomer, silicone, and fiber reinforced composites.

\* \* \* \* \*